United States Patent [19]

Yamamoto et al.

[11] Patent Number: 4,559,456
[45] Date of Patent: Dec. 17, 1985

[54] BATTERY POWERED ELECTRIC APPLIANCE

[75] Inventors: Shigeo Yamamoto; Makoto Tanimizu; Kenzo Shirakawa; Hideji Wataya, all of Hikone, Japan

[73] Assignee: Matsushita Electric Works, Ltd., Osaka, Japan

[21] Appl. No.: 611,868

[22] Filed: May 18, 1984

[30] Foreign Application Priority Data

Jun. 15, 1983 [JP] Japan ................................ 58-106886

[51] Int. Cl.⁴ .............................................. H02J 9/06
[52] U.S. Cl. ........................................ 307/66; 307/65;
307/86; 307/115; 307/142; 200/5 B; 200/18;
200/52 R; 30/DIG. 1
[58] Field of Search ....................... 307/44, 48, 64, 65,
307/66, 75, 85, 86, 115, 130, 131, 142; 200/5 B,
5 E, 17 R, 18, 52 R; 320/6, 15, 22; 361/192,
193, 194; 30/DIG. 1

[56] References Cited

U.S. PATENT DOCUMENTS

| | | | |
|---|---|---|---|
| 2,867,039 | 1/1959 | Zach | 307/66 |
| 3,079,510 | 2/1963 | Hartwig | 307/66 X |
| 3,108,192 | 10/1963 | Reich | 30/DIG. 1 X |
| 3,267,223 | 8/1966 | Larkin | 200/5 B |
| 3,389,323 | 6/1968 | Jepson et al. | 30/DIG. 1 X |
| 3,518,464 | 6/1970 | Jepson et al. | 30/DIG. 1 X |
| 3,631,257 | 12/1971 | Behr | 307/66 |
| 4,044,268 | 8/1977 | Hammel et al. | 307/66 |
| 4,112,271 | 9/1978 | Marchetti | 200/52 R |

Primary Examiner—J. R. Scott
Assistant Examiner—Derek S. Jennings
Attorney, Agent, or Firm—Koda and Androlia

[57] ABSTRACT

A portable type electric appliance powered by incorporated main and reserve batteries. The batteries are connected to an electric load selectively by means of a switching device including a main switch for connecting the main battery to the load and a subsidiary switch for connecting the reserve battery to the load. A lock locks the subsidiary switch in a disconnected position until the main switch is closed. Namely, the subsidiary switch can be closed only after the main switch is closed. Therefore, the main battery is always used prior to the reserve battery, and when the main battery is exhausted, the reserve battery remaining unexhausted is capable of taking over to operate the appliance without requiring immediate replacement of the main battery. Accordingly, the accidental interruption of the operation of the appliance can be avoided.

10 Claims, 18 Drawing Figures

BATTERY POWERED ELECTRIC APPLIANCE

BACKGROUND OF THE DISCLOSURE

1. Fields of the Invention

This invention relates to battery powered electric appliances, more particularly to portable type electric appliances powered by main and subsidiary batteries both incorporated therein.

2. Description of the Prior Art

A conventional portable type electric appliance such as an electric dry shaver is provided with a built-in battery for driving an electric motor, a vibrator, or other kind of electric loads. Such battery is required to be light in weight as well as small in size in order to make the electric appliance portable. Accordingly, the battery is not expected to have a larger capacity due to the restriction on its weight and size. This presents a problem that the battery is subject to a shorter operational life. When an electric dry shaver is powered by such battery of small capacity, for example, it is frequently seen that the operation is interrupted during the shaving by an user, which annoys the user. In order to obviate this drawback, a scheme is suggested as in U.S. Pat. No. 3,108,192 wherein a main battery and a reserve battery are selectively connected to a load by means of a switch. Namely, the reserve battery is to take the place of the main battery, when the main battery becomes empty while the electric appliance is in operation, preventing a sudden interruption of the operation of the electric appliance. However, this type has a drawback that the reserve battery will not take the place of the main battery, if the reserve battery has been already exhausted by mistake before the main battery becomes empty, which would be avoided if the reserve battery were arranged not to be used prior to the main battery.

SUMMARY OF THE INVENTION

The above drawback has been eliminated by the present invention which includes a main battery, a reserve battery of less capacity than that of the main battery, a main switch for connecting the main battery to the electric load, a subsidiary switch for connecting the reserve battery to an electric load, and locking means for retaining the subsidiary switch in the position of disconnecting the reserve battery from the load until the main switch is placed in the position of connecting the main battery to the load. Accordingly, in this invention, the main battery is always used prior to the reserve battery, and when the main battery is exhausted, the reserve battery remaining unexhausted is capable of taking over to operate the appliance without requiring immediate replacement of the main battery, whereby the drawback discussed in the foregoing has been successfully removed.

It is therefore a primary object of the present invention to provide a battery powered electric appliance which is capable of holding or locking the subsidiary switch in the disconnecting position until the main switch is turned to the connecting position, preventing the reserve battery from being exhausted before the exhaustion of the main battery so that the reserve battery can immediately take over the operation of the appliance without interruption and fail.

Another object of the present invention is to provide a battery powered electric appliance in which a simple construction is introduced for locking the subsidiary switch in the disconnecting position until the main switch is turned on.

Still another object of the present invention is to provide a battery powered electric appliance that is capable of prohibiting the adverse current flow from the reserve battery to the main battery when both the main switch and the subsidiary switch are closed.

Further object of the present invention is to provide a battery powered electric appliance that is capable of informing users of the necessity of the exchanging or the recharging of batteries when the reserve battery is in operation.

Other objects and advantages of the present invention will be readily understood from the detailed description thereon taken with the accompanying drawings.

DETAILED DESCRIPTION OF THE PREFERRED EMBODIMENTS

Figure 1:
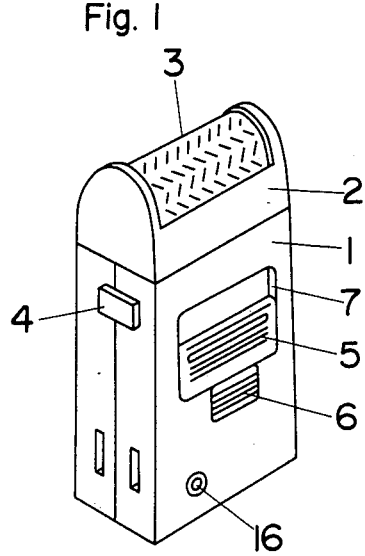
FIG. 1 is a perspective view of an electric dry shaver in accordance with a first embodiment of the present invention.
Figure 2A:
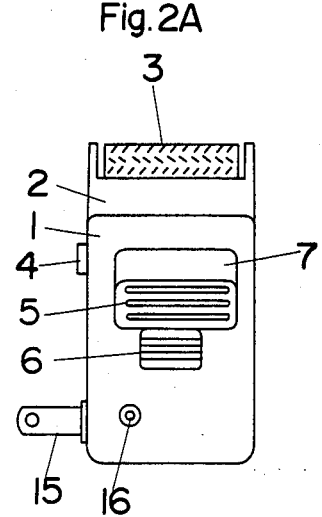
FIGS. 2A, 2B, 2C are explanatory views showing the common manner of using the above dry shaver.
Figure 2B:
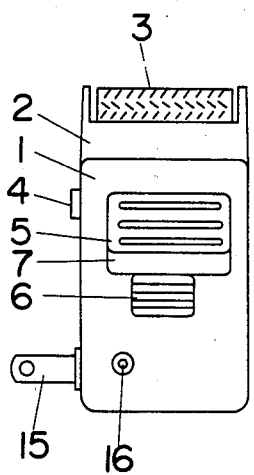
Figure 2C:
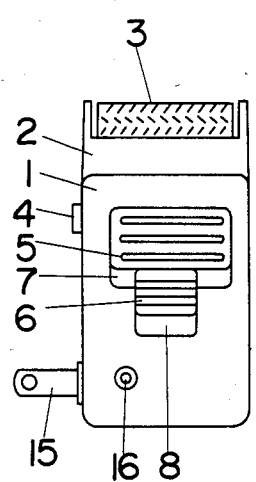

The present invention shall now be explained with reference to a first preferred embodiment as shown in FIGS. 1 through 4. As shown in the drawings, the electric dry shaver is provided with a housing 1 and a frame 2. An outer blade 3 is fitted on the frame 2. The frame 2 can be disengaged from the housing 1 by pressing a button 4. The dry shaver is provided with a main handle 5 and a subsidiary handle 6. The main handle 5 is slidably received within an opening 7 formed in the surface of the housing 1. The main handle 5, when positioned in one end of the opening 7 as shown in FIG. 2A, opens a main switch 9 within the housing 1, and when moved to the other end of the opening 7 as shown in FIGS. 2B and 2C, it closes the main switch 9. The subsidiary handle 6 is slidably received within a cut portion 8 formed at said one end of said opening 7. The sliding operation of the subsidiary handle 6 is rather difficult so long as the main handle 5 stays, as shown in FIG. 2A, in the disconnecting position where the main switch 9 is opened, because such operation requires enough force to operate not only the subsidiary handle 6 but also the main handle 5. Accordingly, the sliding operation of the subsidiary handle 6 is substantially possible only when the main handle 5 is moved, as shown in FIGS. 2B and 2C, to the connecting position where the main switch 9 is closed. In other words, the main handle 5 functions as locking means to hold the subsidiary handle 6 from sliding in the opening 7 out of the cut portion 8 when the main handle 6 stays in the position shown in FIG. 2A. The subsidiary handle 6, when moved in the opening 7 as shown in FIG. 2C, closes a subsidiary switch 10 and simultaneously opens a safety switch 11 connected in series with the main switch 9.

The housing 1 contains an electric motor 12 for driving an inner blade assembly reciprocally. The electric motor 12 is powered by a main battery 13 or a reserve battery 14 selectively. The main battery 13 is connected to the electric motor 12 through the main switch 9 and the safety switch 11, and the reserve battery 14 through the subsidiary switch 10 and an indicator 20 to be described later. The batteries 13 and 14 are both rechargeable in this embodiment. When a user charges the batteries 13 and 14, plugs 15 should be projected from the housing 1 and connected to a power supply receptacle. A lamp 16 is turned on while the batteries 13 and 14 are under charging. The AC voltage of the power source is stepped down by a charging circuit 17 comprising a step-down transformer and the lamp 16. The batteries 13 and 14 are to be charged by the output of the charging circuit 17 through rectifiers 18 and 19. The rectifiers 18 and 19 interrupt mutual current flows between the batteries 13 and 14 in order to maintain the security of the batteries 13 and 14. The ratio of the capacity of the main battery 13 to that of the reserve battery 14 is approximately 2:1. For instance, the capacity of the main battery 13 is 500 mAH, and that of the reserve battery 14 is 225 mAH. The indicator 20 composed of a light emitting diode or a buzzer and the like operates when the reserve battery 14 is in operation and urges users to recharge the batteries 13 and 14.

Figure 3:
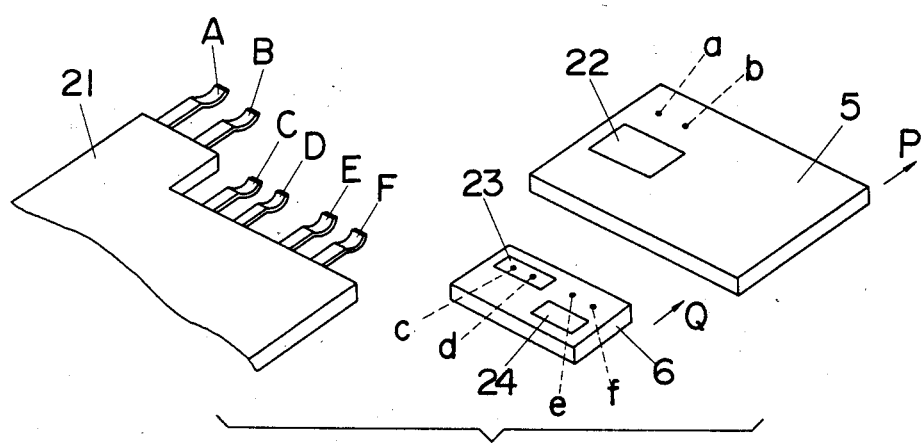
FIG. 3 is a schematic illustration in rather mechanical representation showing an electric switching device employed in the above dry shaver.
Figure 4:
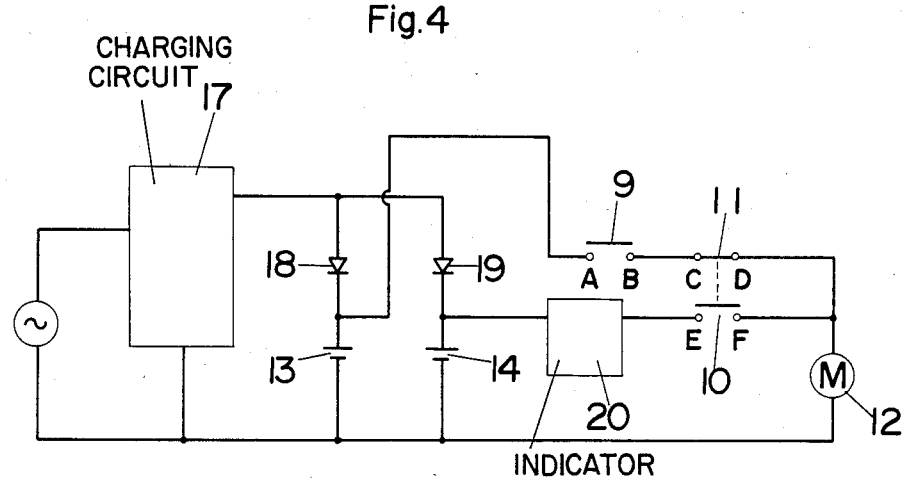
FIG. 4 is a schematic illustration showing an electric circuit employed in the above dry shaver.

FIG. 3 shows the mechanical construction of the main switch 9 and the subsidiary switch 10. Contact springs <A> through <F> are formed on one end of a printed circuit board 21 fixed within the housing 1. The main handle 5 for the main switch 9 is provided with a conductive plate 22 on the rear side. When the main handle 5 stays in the position shown in FIG. 2A, the contact springs <A> and <B> are not in contact with the conductive plate 22. On the contrary, when the main handle 5 is moved in the direction <P> shown in FIG. 3 to the position shown in FIG. 2B, the contact springs <A> and <B> are brought into contact with the conductive plate 22. So, the contact springs <A> and <B> become conductive for connection of the electric motor 12 with the main battery 13. On the other hand, the subsidiary handle 6 for the subsidiary switch 10 is provided with conductive plates 23 and 24 on the rear side. When the subsidiary handle 6 stays in the position shown in FIGS. 2A and 2B, the contact springs <C> and <D> are electrically connected through the conductive plate 23 and the safety switch 11 is closed, while the contact springs <E> and <F> are not electrically connected because the conductive plate 24 is out of contact with the contact springs <E> and <F>, so the subsidiary switch 10 is opened. On the contrary, when the subsidiary handle 6 is moved in the direction <Q> shown in FIG. 3 to the position shown in FIG. 2C, the contact springs <C> and <D> are separated from the conductive plate 23 to open the safety switch 11 in order to disconnect the main battery 13 from the electric motor 12. At this time, the contact springs <E> and <F> are brought into contact with the conductive plate 24 to close the subsidiary switch 10 for connection of the reserve battery 14 with the electric motor 12. Black points <a> through <f> in FIG. 3 indicate the respective positions of contact points of the contact springs <A> through <F> on the corresponding conductive plates 22 through 24 when the main switch 9 and the subsidiary switch 10 are both opened.

Figure 5:
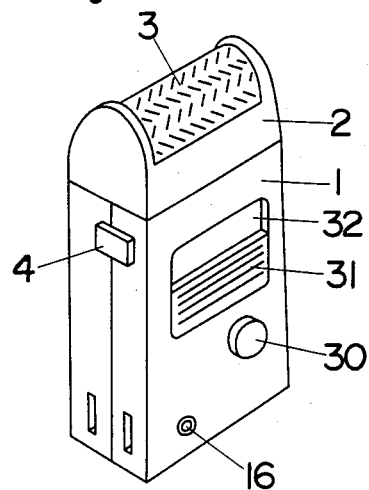
FIG. 5 is a perspective view of an electric dry shaver in accordance with a second embodiment of the present invention.
Figure 6A:
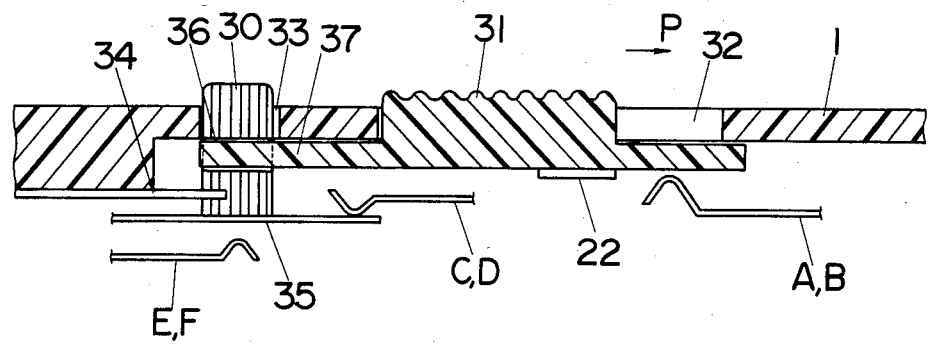
FIGS. 6A and 6B are sectional views to help explain the operation of switching means employed in the above dry shaver.
Figure 6B:
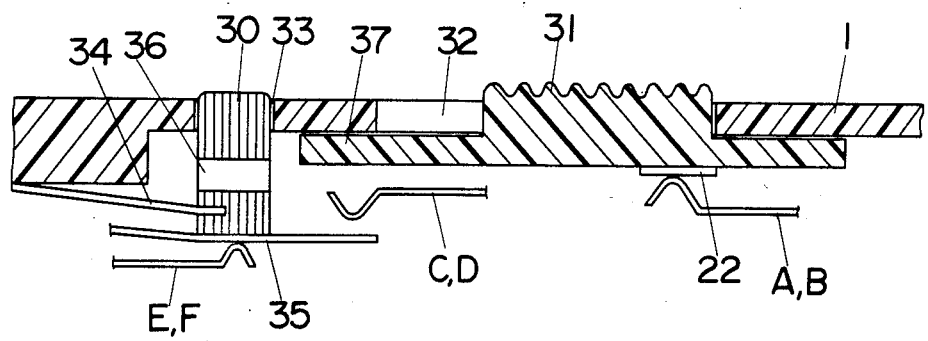
Figure 7:
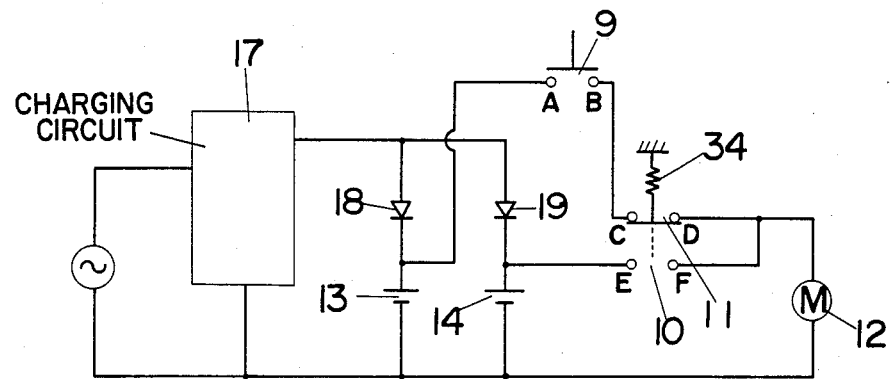
FIG. 7 is a schematic illustration showing an electric circuit employed in the above dry shaver.

A second embodiment of the present invention shown in FIGS. 5 through 7 is substantially similar in construction to the first embodiment except that a subsidiary switch 10 comprises a push-button switch having a round push button 30. Therefore, the same reference numerals as used in the preceding figures are employed to indicate the corresponding parts to avoid the necessity for repeating the relevant explanation. A main switch 9 is composed of a slide switch having a sliding handle 31. The sliding handle 31 is slidably received in an opening 32 formed in the surface of a housing 1. The sliding handle 31 is provided with a conductive plate 22 on the rear side. Contact springs <A> and <B> are in slight contact with the rear side of the sliding handle 31. The conductive plate 22 and the contact springs <A> and <B> belong to the main switch 9. When the sliding handle 31 stays in the lower end of the opening 32 as shown in FIG. 5, a main switch 9 is opened. And when the sliding handle 31 is moved to the upper end of the opening 32 in FIG. 5, the main switch 9 is turned on. The push button 30 is loosely caught in a hole 33 formed in the surface of the housing 1 adjacent to the lower end of the opening 32. A spring plate 34 secured to the housing 1 applies restoring force to the push button 30 and urges the push button 30 outwardly of the housing 1. One end of the spring plate 34 is fixed on the inside of the housing 1 and the other end of the spring plate 34 on the push button 30. A conductive plate 35 is attached to a bottom of the push button 30. When the push button 30 remains unpressed to stay in the position as shown in FIG. 6A, the conductive plate 35 is in contact with contact springs <C> and <D>. When the push button 30 is pressed to the position shown in FIG. 6B, the conductive plate 35 is separated from the contact springs <C> and <D>, but is brought into contact with contact springs <E> and <F>. The conductive plate 35 and the contact springs <C> and <D> are cooperative to form a safety switch 11, while the conductive plate 35 and the contact springs <E> and <F> form a subsidiary switch 10. When the push button 30 is pressed, the subsidiary switch 10 is closed and the safety switch 11 is opened. And when the push button 30 remains unpressed, the subsidiary switch 10 is opened and the safety switch 11 is closed, as the push button 30 returns back to its initial position shown in FIG. 6A by the urging force of the spring plate 34. When the sliding handle 31 is operated in the direction <P> shown in FIG. 6A, the main switch 9 and the safety switch 11 is closed to connect the main battery 13 to the electric motor 12 to be driven thereby. On the contrary, when the push button 30 is pressed as shown in FIG. 6B, the subsidiary switch 10 is closed and the safety switch 11 is opened, so that the electric motor 12 is connected to and driven by the reserve battery 14 while it is disconnected from the main battery 13. The push button 30 is provided with a hole 36 which extends radially through the flank thereof for receiving a latch 37 projecting from one end of the sliding handle 31. The latch 37, when the sliding handle 31 is in the disconnecting position, extends into the hole 36 so as to lock the push button 30 in its disconnecting position, prohibiting it from being pressed toward the connecting position, as shown in FIG. 6A. Therefore, in this embodiment, so long as the main switch 9 is opened, the subsidiary switch 10 is kept opened and the safety switch 11 is kept closed. But when the sliding handle 31 is moved to the position shown in FIG. 6B, the latch 37 is disengaged from the hole 36 to allow the push button 30 to be pressed. Accordingly, the hole 36 of the push button 30 and the latch 37 of the sliding handle 31 function as locking means to prohibit the pressing operation of the push button 30 when the main switch 9 is not closed.

In the following embodiments, the same reference numerals as used in the preceding figures are employed again to indicate the corresponding parts in order to leave out the same explanation already set forth in the preceding embodiments.

Figure 8A:
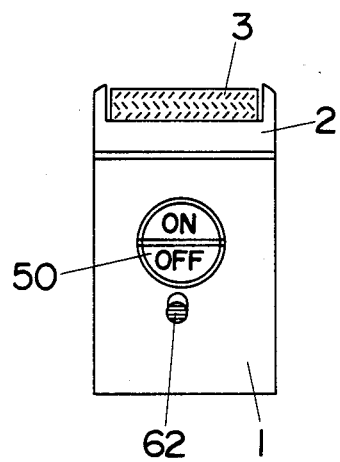
FIG. 8A is an elevation of an electric dry shaver in accordance with a third embodiment of the present invention.
Figure 8B:
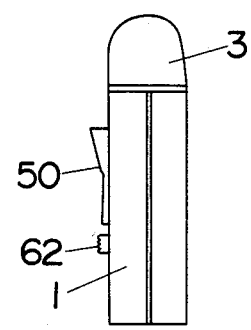
FIG. 8B is a side elevation of the above dry shaver.
Figure 9A:
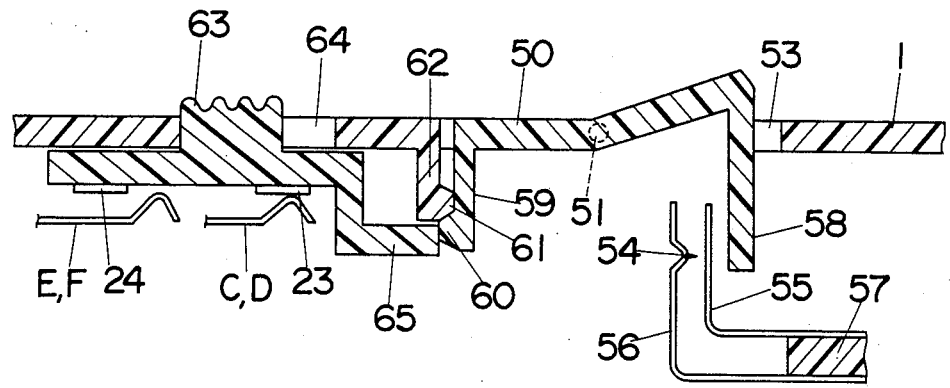
FIGS. 9A and 9B are sectional views to help explain the operation of switching means employed in the above dry shaver.
Figure 9B:
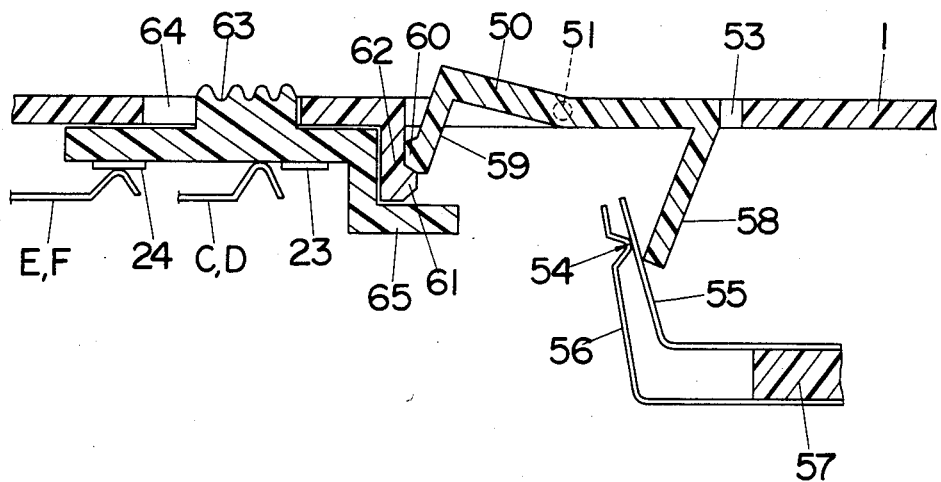
Figure 10:
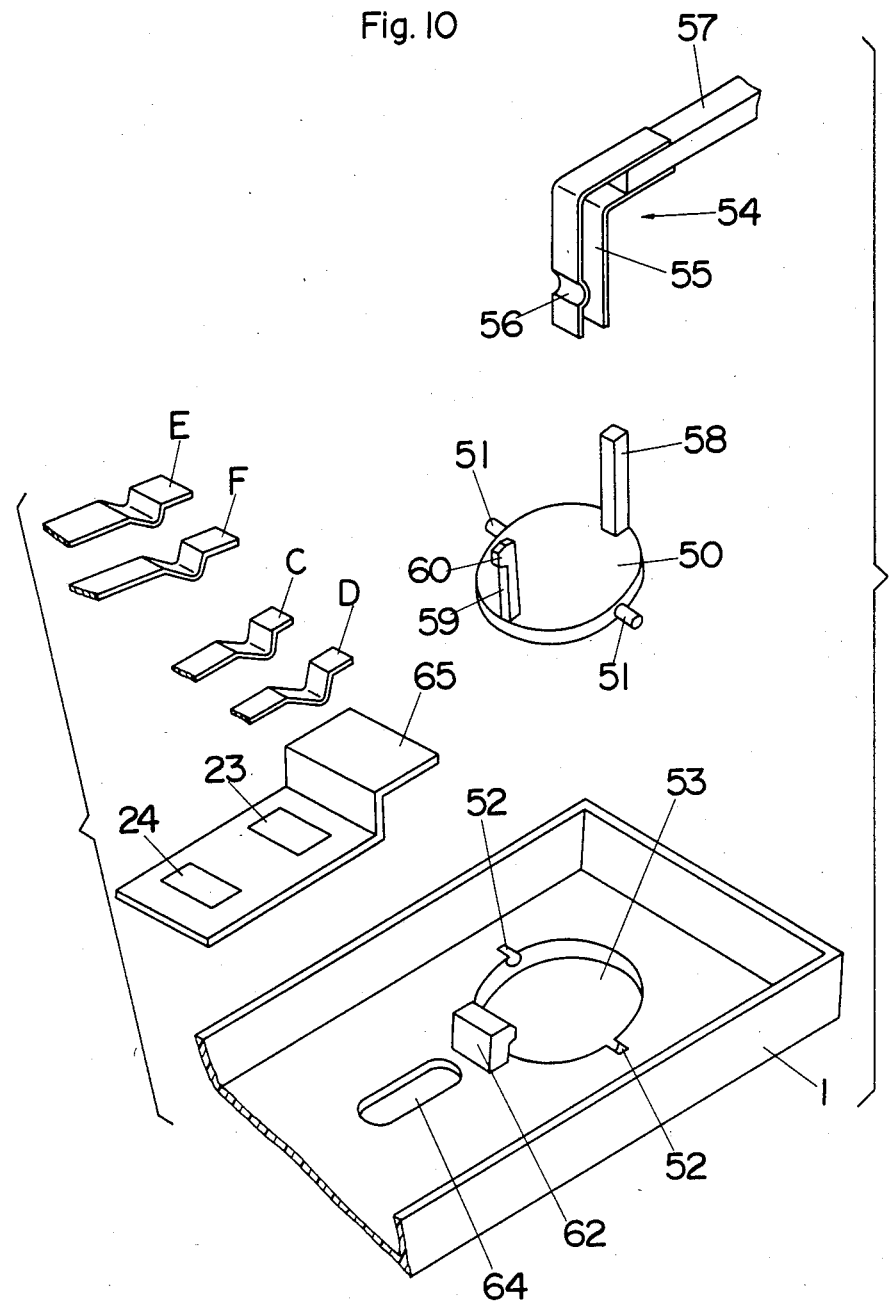
FIG. 10 is a perspective view of the respective members composing the above switching means.

A third embodiment of the present invention shown in FIGS. 8 through 10 is also substantially similar in construction to the first embodiment except that a main switch 9 comprises a tumbler switch having a tumbler handle 50. The tumbler handle 50 is provided with a couple of pivot pins 51 on both sides that are held by bearings 52 formed at both inner sides of a hole 53 opened on a housing 1. A latch leg 59 is projected from the rear side of one end of the tumbler handle 50. A latch nail 60 is formed at the tip of the latch leg 59. The latch nail 60 is engageable with a cooperative latch nail 61 formed at the tip of a latch leg 62 on the side of the housing 1. The latch leg 62 is projected from the inner side of the housing 1 and is downwardly into the hole 53 to be located adjacent to the tumbler handle 50. The main switch 50 includes contact means 54 which has a couple of contact springs 55 and 56 that are electrically insulated and supported by a spacer 57. The contact means 54 is operated by a manipulating rod 58 projecting downwardly from the other end of the tumbler handle 50. The contact means 54 opens when said one end of the tumbler handle 50 is pressed as shown in FIG. 9A and closes when the other end of the tumbler handle 50 is pressed as shown in FIG. 9B.

A subsidiary switch 10 comprises a slide switch having a sliding handle 63. The sliding handle 63 is slidably mounted on the rear side of the housing 1 with an operating knob received within an opening 64 which is formed in the surface of the housing 1 and is adjacent to said one end of the tumbler handle 50. The sliding handle 63 is provided with conductive plates 23 and 24 on the rear side. Secured to and within the housing 1 are contact springs <C> through <F> which are arranged to be in sliding contact with the rear side of the sliding handle 63. The conductive plate 23 and the contact springs <C> and <D> are cooperative to form a safety switch 11. The conductive plate 24 and the contact springs <E> and <F> are combined to form the subsidiary switch 10. An electric circuit employed in this embodiment is just the same as that employed in the first embodiment. When the sliding handle 63 stays in the position shown in FIG. 9A, the conductive plate 23 is in contact with the contact springs <C> and <D> to close the safety switch 11, while the conductive plate 24 is out of contact with the contact springs <E> and <F> to open the subsidiary switch 10. And when the sliding handle 63 is moved to the position shown in FIG. 9B, the conductive plate 23 is disconnected from the contact springs <C> and <D> to open the safety switch 11, while the conductive plate 24 is brought into contact with the contact springs <E> and <F> to close the subsidiary switch 10. The sliding handle 63 is provided at its front end with a projection 65 which extends toward the tumbler handle 50 to be engageable with said latch nail 60 thereof. When the tumbler handle 50 and the sliding handle 63 are in the position shown in FIG. 9A, the projection 65 abuts against the latch nail 60 so as not to be moved forward. So, the projection 65 and the latch nail 60 function as locking means to hinder the sliding operation of the sliding handle 63 from the disconnecting position to the connecting position so long as the main switch 9 remains open. When the tumbler handle 50 is moved in the position of connecting the main battery 13 to the electric motor 12, as shown in FIG. 9B, the projection 65 moves upwardly away from the latch nail 60 to disengage the projection 65 therefrom. Thus the sliding handle 62 is allowed to slide in the position of connecting the reserve battery 14 to the electric motor 12. Accordingly, the subsidiary switch 10 can be closed only after the main switch 9 is closed.

Figure 11:
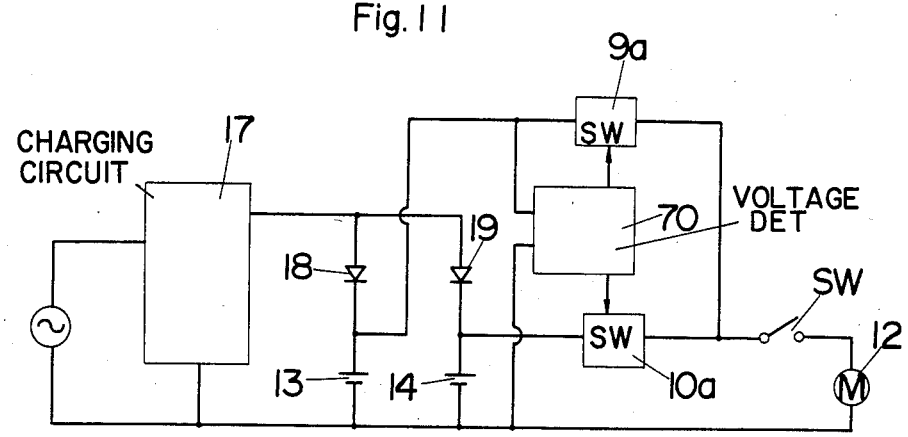
FIG. 11 is a schematic illustration showing an electric circuit employed in a fourth embodiment of the present invention.

FIG. 11 shows a fourth embodiment of the present invention. This embodiment comprises a voltage detecting circuit 70 which detects the terminal voltage of the main battery 13 and controls a main switch 9a and a subsidiary switch 10a accordance with the detected result. The main switch 9 and the subsidiary switch 10 comprise electrically controlled switching elements 9a and 10a respectively. A switch SW is a manually controlled switch which is connected in series with the switching elements 9a and 10a between the electric motor 12 and the respective batteries 13 and 14. When the switch SW is closed, the electric motor 12 is driven by either of the main battery 13 and the reserve battery 14. The voltage detecting circuit 70 controls the switching element 9a and 10a to close selectively in such a manner as to close the switching element 9a at the same time open the switching element 10a when the voltage of the main battery 13 is detected to be above a predetermined level sufficient for driving the electric motor 12 and vice versa when the voltage of the main battery 13 is detected to be below that level. Therefore, in this embodiment, the reserve battery 14 is in no case used before the main battery 13 becomes empty and even if the main battery 11 is exhausted, the reserve battery 14 still remains unused, so the reserve battery 11 can take the place of the main battery 12 without fail.

Figure 12:
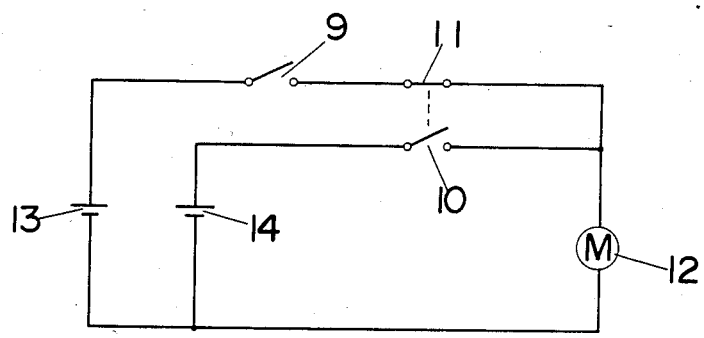
FIG. 12 is a schematic illustration showing an electric circuit employed in a first modification of the first embodiment of the present invention.
Figure 13:
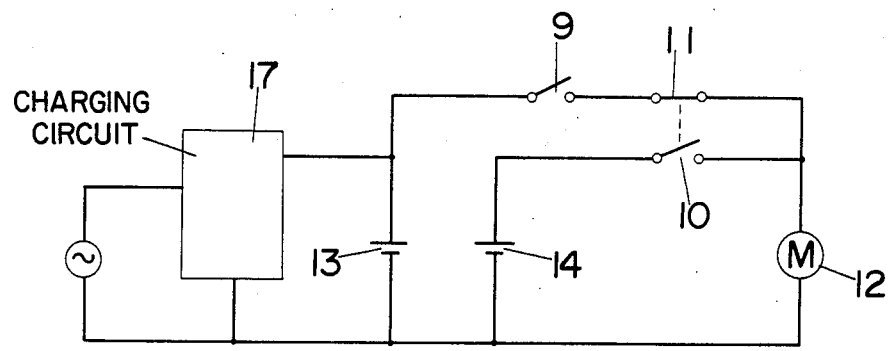
FIG. 13 is a schematic illustration showing an electric circuit employed in a second modification of the first embodiment of the present invention.

FIG. 12 shows a first modification of the first embodiment wherein both the main battery 13 and the reserve battery 14 are composed of dry batteries. FIG. 13 shows a second modification of the same embodiment wherein the main battery 13 is composed of a rechargeable battery, while the subsidiary battery 12 is composed of a dry battery.

Although the present invention has been described in its preferred embodiments, it should be understood by those skilled in the art that the present invention is not limited to the present embodiments and that various changes and modifications may be made without departing from the scope of the present invention.

What is claimed is:

1. A battery powered electric appliance comprising:
   a main battery,
   a reserve battery of less capacity than that of the main battery;
   main switching means for connecting the main battery to a load to be driven thereby and disconnecting it therefrom;
   subsidiary switching means for connecting the reserve battery to the load to be driven thereby and disconnecting it therefrom; and
   locking means for holding the subsidiary switching means from connecting the reserve battery to the load until the main switching means is in operative position of connecting the main battery to the load.

2. The battery powered electric appliance as set forth in claim 1, wherein said main switching means is in the form of a slide switch comprising a main handle slidably mounted on a housing of the electric appliance for movement between on and off positions and wherein said subsidiary switching means is in the form of a slide switch comprising a subsidiary handle slidably mounted on the housing for movement in the same direction as the main handle between on and off positions, the operative relationship between the main handle and the subsidiary handle being such that the main handle when in the off position is in abutting engagement with the subsidiary handle in the off position so as to lock the subsidiary handle in the off position and that the main handle when moved into the on position is spaced from the subsidiary handle in the off position so as to leave therebetween a distance within which the subsidiary handle can move into the on position.

3. The battery powered electric appliance as set forth in claim 1, wherein said main switching means is in the form of a slide switch comprising a main handle slidably mounted on a housing of the electric appliance for movement between on and off positions, and wherein said subsidiary switching means is in the form of a push-button switch comprising a push button mounted on and partly within the housing for movement in the direction perpendicular to that of the main handle between on and off positions, said main handle being provided with a latch which extends therefrom toward the push button so as to be cooperative with a hole formed in the push button, said latch being projected into the hole to arrest the push button in the off position when the main handle is in the off position while it being released out of the hole to allow the movement of the push button when the main handle is in the on position, said push button being biased by spring means toward the off position.

4. The battery powered electric appliance as set forth in claim 1, wherein said main switching means is in the form of a tumbler switch comprising a tumbler handle being pivoted to a housing of the electric appliance for pivotal movement about an axis between on and off positions, and wherein said subsidiary switching means is in the form of a slide switch comprising a handle slidably mounted on the housing adjacent to the tumbler handle for movement in the direction perpendicular to the pivot axis of the tumbler handle between on and off positions, said tumbler handle being formed with a latch leg extending interiorly of the housing from the tumbler handle at the end portion spaced from the pivot axis but adjacent to the slide handle, said latch leg being in abutting engagement with the forward end of the slide handle to arrest the slide handle in its off position when the tumbler handle is in the off position and being out of that engagement to allow the slide handle to move into the on position when the tumbler handle is in the on position.

5. The battery powered electric appliance as set forth in claim 1, wherein said locking means comprises a voltage detecting circuit connected between the load and the main battery for comparing the terminal voltage of the main battery with a predetermined voltage level which is a minimum voltage enough to drive the load so that it provides a first output when the voltage of the main battery is detected to be above the predetermined voltage level and a second output when it is below the predetermined voltage, and wherein said main switching means comprises an electrically controlled switching element which connects the main battery to the load when it receives the first output from the voltage detecting circuit and wherein said subsidiary switching means comprises an electrically controlled switching element which connects the reserve battery to the load when it receives the second output from the voltage detecting circuit.

6. The battery powered electric appliance as set forth in claim 1, including switching means for disengaging the electrical connection between the main battery and the load when said subsidiary switching means is in the on position.

7. The battery powered electric appliance as set forth in claim 1, including indicator means which provides an indication only when the reserve battery is connected to the load.

8. The battery powered electric appliance as set forth in claim 1, wherein said main and reserve batteries are of rechargeable ones.

9. The battery powered electric appliance as set forth in claim 1, wherein said main and reserve batteries are of dry batteries.

10. The battery powered electric appliance as set forth in claim 1, wherein said main battery is of rechargeable one while said reserve battery is of dry battery.

* * * * *